Figure 1:
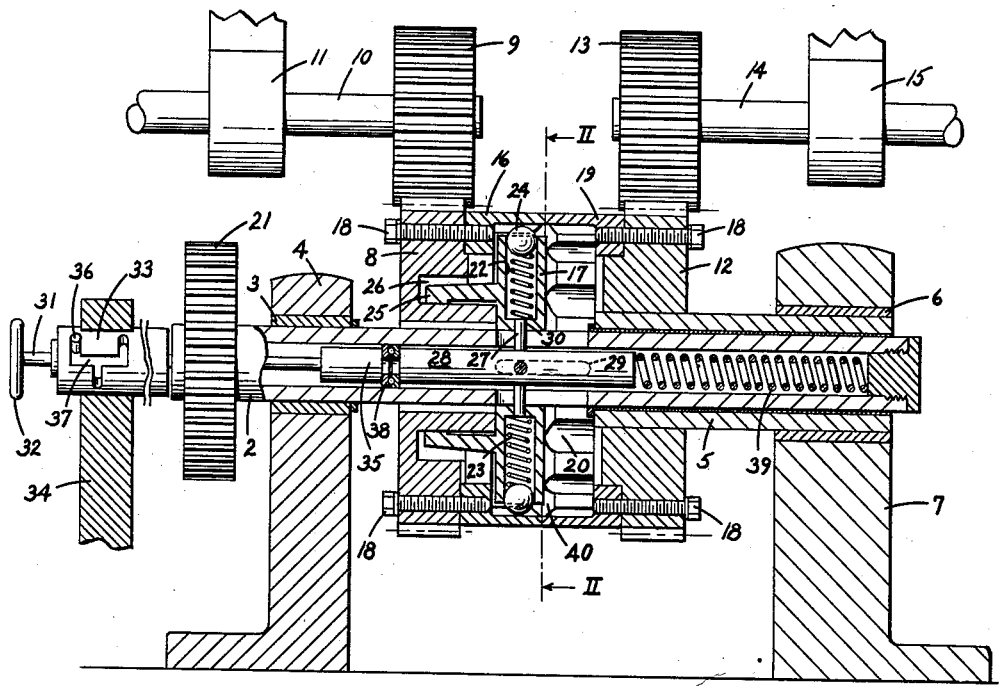

March 13, 1951  R. W. STANLEY  2,544,809

OVERLOAD RELEASE CLUTCH

Filed April 10, 1945

INVENTOR.
Richard W. Stanley
BY
Carl A. Castellan
Atty.

Patented Mar. 13, 1951

2,544,809

UNITED STATES PATENT OFFICE 2,544,809

OVERLOAD RELEASE CLUTCH

Richard W. Stanley, Drexel Hill, Pa., assignor to American Viscose Corporation, Wilmington, Del., a corporation of Delaware Application April 10, 1945, Serial No. 587,449

8 Claims. (Cl. 192—56)

This invention relates to transmission systems.

It is a primary object of the present invention to provide an improved transmission system comprising two driving members adapted to be coupled selectively in positive drive relationship with a driven member. A further object is to provide a transmission system including means for automatically disengaging the respective driving members from the driven member in response to overloading.

Another object is to provide a slip clutch of novel construction for use in such a transmission system. Other objects and advantages of the invention will be apparent from the accompanying drawing and the following description.

In the drawing illustrative of the invention

Figure 2:
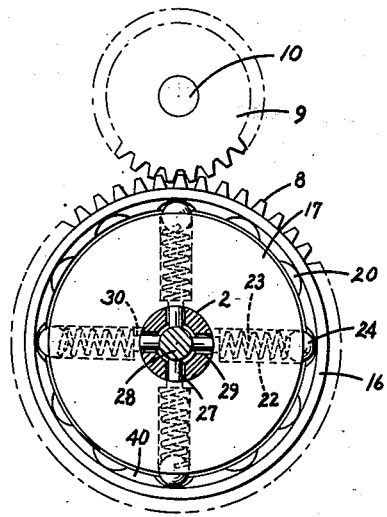

Figure 1 is an elevation, in section, of a transmission system according to the invention, and Figure 2 is a view, partly in section, taken on line II—II of Figure 1.

Referring to the drawing, a shaft 2 to be driven is shown, one end thereof being supported in bearing 3 on upright 4, and the other end being surrounded by stub shaft 5 supported in bearing 6 on upright 7. A driven member, such as a gear 8 is mounted for rotation relative to shaft 2 and meshes with a driving member, such as a gear 9 secured on driving shaft 10 which is supported in bearing 11. A driven member, such as a gear 12 is mounted for rotation with a hollow stub shaft 5 rotatably mounted on shaft 2, and meshes with a driving member, such as a gear 13 fixedly secured on driving shaft 14 supported in bearing 15. Positioned between gears 8 and 12 is a slip clutch comprising two face-to-face annuli 16 and 19 which overhang and form a shroud for a slidable clutch member 17 supported therebetween. Annulus 16 is fixedly secured to gear 8 and annulus 19 is fixedly secured to gear 12 by cap screws 18. Annuli 16 and 19 are provided with internal grooves 20, spaced annularly thereabout. The annuli 16 and 19 constitute coupling members of the clutch which are driven at different speeds by the driving shafts 10 and 14. The complementary clutch member 17 is arranged to be selectively coupled with the driven members 8 and 12 through annuli 16 and 19 and it comprises an annular or flange-like body which has recesses 22 extending inwardly from its outer periphery for accommodating springs 23 supporting balls 24 which are adapted to seat in grooves 20 in the annuli 16 or 19, or to roll in and out of the grooves for automatically interrupting the positive drive relationship between the respective driving members and the driven member under certain conditions of operation as will be described more fully hereinafter. The slidable clutch member 17 has a hub 25 which projects into an annular recess 26 in gear 8 to provide additional bearing surface. Pins 27 are secured to a slidable rod 28 within the hollow shaft 2, and extend through slots 29 in such shaft into bores 30 within the inner periphery of the slidable clutch member 17. Thus this member 17 is secured to rotate the shaft 2, but is axially shiftable with respect to the shaft to connect it selectively with the driving members 9 and 13 operating at different speeds. This selective coupling is accomplished by shifting a rod 31 by means of a hand-wheel 32 secured thereto. Rod 31 extends through a stationary hollow support 33 mounted on a post 34 and partway into shaft 2. Rod 31 has an enlarged end 35. The rod also carries a pin 36 which rides in a branched slot 37 in support 33. A ball thrust bearing 38 in shaft 2 permits rotation of rod 28 relative to rod 31. A spring 39 is positioned in the other end of shaft 2, that is in the end opposite rod 31, and normally forces the rod 28 toward the left as shown. An annular groove 40 between the face-to-face annuli 16 and 19 provides an annular race in which balls 24 run freely when they are not seated in the grooves 20 of either annulus, thus providing a neutral position for the shiftable clutch member and permitting driven shaft 2 to be halted without interrupting rotation of shafts 10 and 14. Pin 36, slot 37, and spring 39 assist in maintaining the shiftable clutch member in neutral position or in driving position. Rod 28 affords a ready means of contacting the shiftable clutch member for adjustment thereof from the exterior of the system.

Operation is as follows: Assuming the shiftable clutch member to be in neutral position, pin 36 is retained in the central branch of slot 37 and balls 24 run free in annular race 40. If it is desired to drive shaft 2 from shaft 10 through gears 8 and 9, rod 31 is pulled outwardly so that the shiftable clutch member shifts to the left on shaft 2, pin 36 rides into the outer branch of slot 37, and spring 39 urges rod 28 to the left as shown in Figure 1. Balls 24 seat in grooves 20 in annulus 16, and drive shaft 10 is coupled, through meshing gears 8 and 9 and engagement of clutch member 16 with complementary shiftable clutch member 17, in positive drive relationship with shaft 2. As long as the torque differential between shafts 2 and 10 remains below a predetermined amount, balls 24 remain seated in the grooves of annulus 16. If, however, a torque differential occurs between shafts 2 and 10, which is of greater magnitude than can be handled by the clutch, i. e. in case of overloading, springs 23 are forced inwardly in recesses 22 so that balls 24 move out of, and then roll in and out of, the grooves in annulus 16. The positive drive relationship between shaft 2 and shaft 10 is thus automatically disrupted, and relative rotation therebetween occurs, that is shaft 2 slips with respect to shaft 10. During such slipping, balls 24 make rolling contact with the grooves and intervening lands of annulus 16, which prevents undue wear on the several elements of the system.

When it is desired to drive shaft 2 from driving shaft 14, as when it is desired to change the speed of rotation of shaft 2, rods 31 and 28 may be pushed inwardly overcoming the pressure exerted on rod 28 by spring 39. In response to such movement, the shiftable clutch member 17 shifts as a unit to the right, and balls 24 seat in grooves 20 in annulus 19, to thereby selectively couple driving shaft 14 to driven shaft 2 through gears 13 and 12, in positive drive relation. Pin 36 is moved into the right hand branch of slot 37 where it is retained. The balls remain seated in the grooves 20 of annulus 19 as long as the torque differential between shafts 2 and shaft 14 remains below a predetermined value, but if a change occurs of such magnitude that it cannot be handled by the clutch, springs 23 are forced inwardly in recesses 22 so that balls 24 move out of, and then roll in and out of, the grooves of annulus 19, thereby automatically interrupting the positive drive relationship between driving shaft 14 and shaft 2, and permitting the driven shaft to slip with respect to the driving shaft until the torque differential between the driven and driving shafts is again below the predetermined safe level.

It will be obvious that by proper manipulation of the hand-controlled shiftable clutch member, the driven shaft may be rotated selectively from either of the driving members respectively, and that the speed of rotation of the driven shaft may be changed at will by coupling it to the driving shafts selectively, or the driven shaft may even be halted by shifting the shiftable clutch member to the neutral position, without interrupting rotation of the respective driving members. The construction of the slip clutch is such that the grooved annuli comprising the clutch overhang and enshroud the shiftable clutch member and the balls 24 are restrained and do not fly out as the shiftable clutch member is manipulated. Driven shaft 2 may in turn drive one or more other devices (not shown) through gear 21 fixedly secured thereto.

Modifications may be made in the transmission system specifically disclosed and illustrated here without departing from the spirit and scope of the invention as defined in the appended claims.

I claim:

1. In a transmission system comprising a shaft to be driven, two driving members, two driven members axially spaced apart and mounted on the shaft for rotation relative thereto, each of the driven members being mounted in driving engagement with a corresponding driving member, an annular clutch member secured to each of the driven members, a complementary clutch member axially slidably mounted on the shaft, and means for axially shifting the complementary clutch member to selectively engage it with the annular clutch members, the improvement characterized by the fact that the outer peripheral portion of each annular clutch member extends from its respective driven member toward the other driven member into contiguity with the outer peripheral portion of the other annular clutch member to form a shroud surrounding the space between the driven members, and the complementary clutch member is mounted within said shrouded space.

2. In a system as defined in claim 1, the further improvement characterized in that the annular clutch members have axial grooves on an internally facing surface, and the complementary clutch member comprises movable elements for engaging the grooves and spring means for urging the elements radially outwardly.

3. In a system as defined in claim 2, the further improvement characterized in that an annular groove is provided within the adjacent ends of the annular clutch members to provide a race for the elements in a neutral, free-running position of the complementary clutch member.

4. In a system as defined in claim 3, the further improvement characterized in that the elements are balls, the shaft is hollow and has an axial slot, and the shifting means comprises a rod extending axially through the shaft, spring means within the shaft for urging the rod axially thereof, a pin extending through the slot and secured to the rod and the complementary clutch member, and adjustable detent means for setting the rod in a predetermined axial position.

5. A clutch device comprising a pair of annular clutch members on a common axis or shaft mounted close to each other for rotation independently of each other, the outer annular peripheral portion of each annular clutch member extending into contiguity with that of the other to form a shroud surrounding a space around the shaft, a complementary clutch member within said space axially slidably mounted on the shaft for rotation with the shaft, and means for axially shifting the complementary clutch member to selectively engage it with the annular clutch members.

6. A clutch device as defined in claim 5 in which the annular clutch members have axial grooves on an internally facing surface, and the complementary clutch member comprises movable elements for engaging the grooves and spring means for urging the elements radially outwardly.

7. A clutch device as defined in claim 6 in which an annular groove is provided within the adjacent ends of the annular clutch members to provide a race for the elements in a neutral, free-running position of the complementary clutch member.

8. A clutch device as defined in claim 7 in which the elements are balls, the shaft is hollow and has an axial slot, and the shifting means comprises a rod extending axially through the shaft, spring means within the shaft for urging the rod axially thereof, a pin extending through the slot and secured to the rod and the complementary clutch member, and adjustable detent means for setting the rod in a predetermined axial position.

RICHARD W. STANLEY.

REFERENCES CITED

The following references are of record in the file of this patent:

UNITED STATES PATENTS

| Number | Name | Date |
| --- | --- | --- |
| 774,843 | Holz | Nov. 15, 1904 |
| 1,671,521 | Fisher | May 29, 1928 |
| 1,990,999 | Pondelicek | Feb. 12, 1935 |
| 2,048,883 | Murray | July 28, 1936 |
| 2,080,079 | Johnson | May 11, 1937 |
| 2,128,715 | Reich | Aug. 30, 1938 |

FOREIGN PATENTS

| Number | Country | Date |
| --- | --- | --- |
| 259,277 | Italy | June 20, 1928 |